United States Patent [19]
Abadia et al.

[11] Patent Number: 5,883,450
[45] Date of Patent: Mar. 16, 1999

[54] ALTERNATOR, IN PARTICULAR FOR A MOTOR VEHICLE INCLUDING AN IMPROVED ARRANGEMENT OF RECTIFIER DIODES

[75] Inventors: Roger Abadia, Neuilly Plaisance; Jean-Luc Tarrago, Bonneuil S/Marne, both of France

[73] Assignee: Valeo Equipements Electriques Moteur, Creteil, France

[21] Appl. No.: 647,799

[22] Filed: May 15, 1996

[30] Foreign Application Priority Data

May 17, 1995 [FR] France ................................... 95 05858

[51] Int. Cl.⁶ .................................................. H02K 11/00
[52] U.S. Cl. .................. 310/68 D; 310/67 R; 310/68 R; 310/71; 310/58; 310/59; 310/60 A
[58] Field of Search ............... 310/68 D, 67 R, 310/68 R, 71

[56] References Cited

U.S. PATENT DOCUMENTS

| | | | |
|---|---|---|---|
| 4,284,915 | 8/1981 | Hagenlocher et al. | 310/68 D |
| 4,952,829 | 8/1990 | Armbuster et al. | 310/68 D |
| 5,043,614 | 8/1991 | Yockey | 310/68 D |
| 5,296,770 | 3/1994 | Pflueger et al. | 310/14 |
| 5,331,231 | 7/1994 | Koplin et al. | 310/68 D |
| 5,451,823 | 9/1995 | Deverall et al. | 310/68 D |
| 5,473,208 | 12/1995 | Stihi | 310/68 D |

FOREIGN PATENT DOCUMENTS

| | | | |
|---|---|---|---|
| 2 441 286 | 6/1980 | France | 310/68 D |
| 30 12 636 | 10/1981 | Germany | 310/68 D |

*Primary Examiner*—Clayton LaBalle
*Assistant Examiner*—Elvin G. Enad
*Attorney, Agent, or Firm*—McCormick, Paulding & Huber

[57] ABSTRACT

An alternator, in particular for a motor vehicle, comprises half-shells to which stator windings are fixed and which rotatably receive a rotor shaft, and a rectifier circuit made up of power diodes each comprising body and a lead extending axially from said body. The bodies of some of the diodes are connected to ground while the bodies of the other diodes are connected to an output terminal of the alternator. The diode bodies are fixed on or in the back half-shell of the alternator on or in a dissipating support which is generally in the form of a plate that is insulated from the half-shell and that is outside it. According to the invention, the distance between the dissipating support and the back half-shell, and the positions of the said other diodes on the dissipating support are such that the leads of said other diodes project into openings formed in the back half-shell.

7 Claims, 2 Drawing Sheets

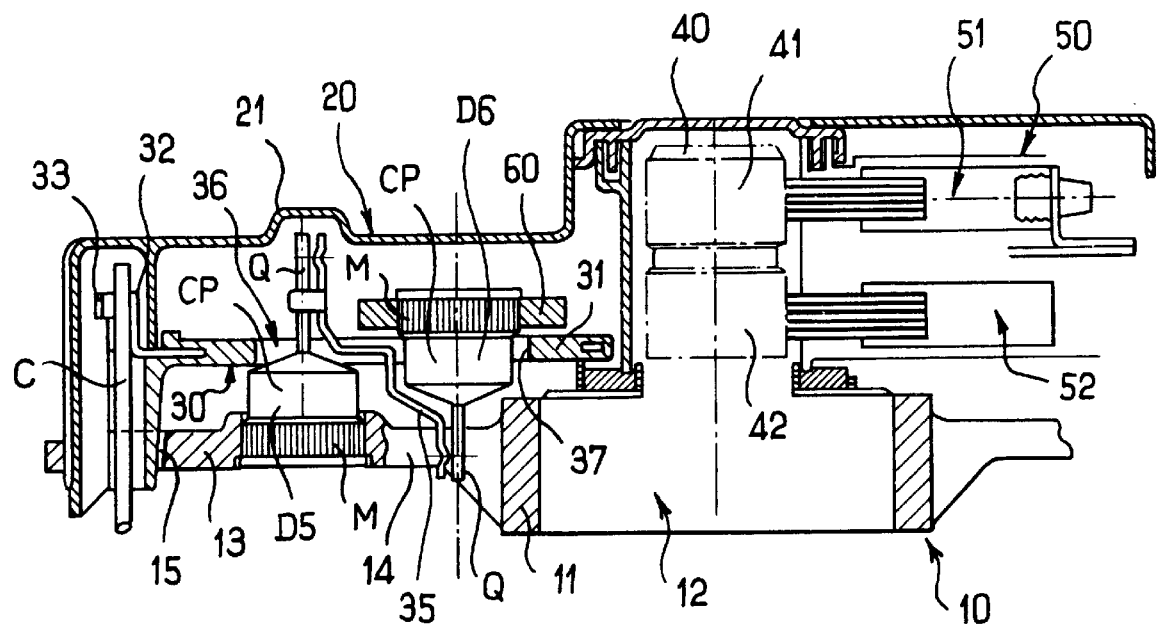
FIG_1
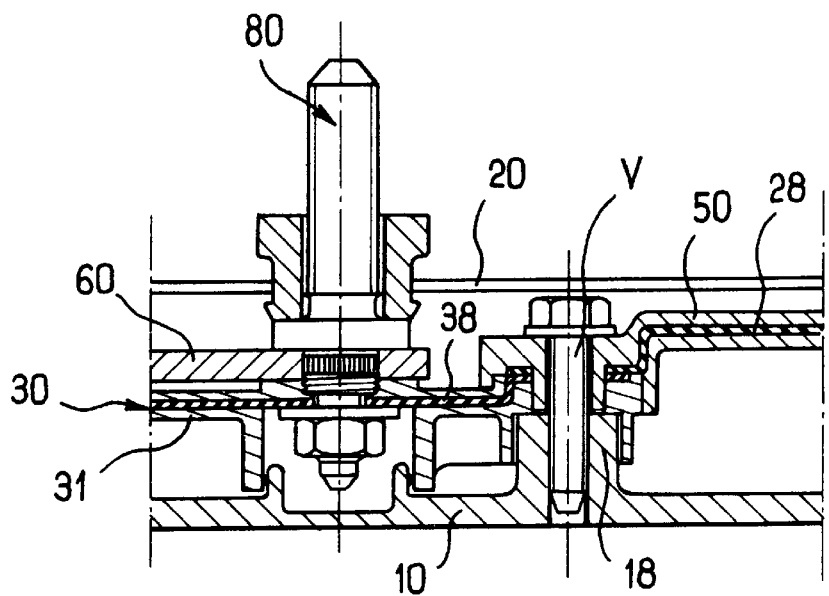
FIG_2

ALTERNATOR, IN PARTICULAR FOR A MOTOR VEHICLE INCLUDING AN IMPROVED ARRANGEMENT OF RECTIFIER DIODES

The present invention relates in general to alternators, and in particular to alternators for motor vehicles, and it relates more particularly to a novel arrangement of rectifier diodes of such an alternator in the vicinity of the back bearing thereof.

BACKGROUND OF THE INVENTION

In general, an alternator is in the form of a structure made up of two metal bearing assemblies or half-shells, with each half-shell receiving one end of a rotor shaft, and with a stator being mounted stationary relative to the half-shells.

Such an alternator also includes a regulator circuit and a set of diodes for rectifying the alternating voltages delivered by the stator windings.

These diodes are generally mounted by means of appropriate fittings on the outside of one of the alternator half-shells, i.e. the "back" half-shell as compared with the front half-shell which is situated adjacent to the pulley wheel for driving the alternator.

A requirement when designing an alternator is to ensure that the arrangement, in particular of the rectifier diodes, does not excessively increase the axial length of the alternator.

To reduce this length, in the context of a polyphase alternator having one set of diodes at the negative side and another set of diodes at the positive side, whose bodies are connected respectively to ground and to the positive output terminal of the alternator, it is known that the negative side diodes can be engaged as force-fits directly in the back half-shell of the alternator.

However, the positive side diodes must be situated some distance axially from the negative side diodes, and appropriate means for connecting the diodes to the windings of the alternator stator must also be housed in the vicinity of the diodes.

OBJECTS AND SUMMARY OF THE INVENTION

The invention seeks to further reduce the axial length of that type of alternator.

A secondary object of the present invention is also to improve the cooling of at least some of the diodes in the rectifier circuit.

To this end, the invention provides an alternator, in particular for a motor vehicle, the alternator being of the type comprising a front half-shell and a back half-shell to which stator windings are fixed and rotatably receiving a rotor shaft, and a rectifier circuit comprising a plurality of power diodes each presenting a generally cylindrical body constituting a first connection terminal with a lead extending axially from said body and constituting a second connection terminal, the diodes comprising both first diodes whose bodies are connected to ground and second diodes whose bodies are connected to an output voltage terminal of the alternator, the diodes being held in place by means of their bodies, and the first diodes being fixed on or in the back half-shell of the alternator while the second diodes are fixed on or in a dissipating support which is generally in the form of a plate that is electrically insulated from the back half-shell and that is situated outside it, wherein the distance between said dissipating support and said back half-shell, and the positions of the second diodes on the dissipating support are such that the leads of said second diodes project into openings formed in the back half-shell.

Preferred, but non-limiting features of the alternator of the invention are the following:

the diodes are fixed by being force-fits, with the first diodes being force-fitted directly in the back half-shell;

said openings are openings for passing air;

the alternator further includes a generally plane diode connector extending between the back half-shell and the dissipating support;

said connector is made by overmolding insulating material on a set of generally plane conductors, and openings are provided in the insulating material to pass the bodies of the diodes where they project beyond the half-shell and the dissipating support; and said openings formed in the insulating material of the connector are common for two adjacent first and second diodes;

in association with two adjacent diodes disposed head-to-tail, the connector includes a conductor projecting on both sides of the plane of said connector, said projecting portions being respectively connected to the leads of said adjacent diodes; and said connector includes a plane conductor designed to connect the dissipating support with an electronic regulator circuit by pressure contact at a screw for mounting said connector.

BRIEF DESCRIPTION OF THE DRAWINGS

Other features, objects, and advantages of the present invention appear more clearly on reading the following detailed description of a preferred embodiment thereof, given by way of non-limiting example and made with reference to the accompanying drawings, in which:

FIG. 1 is a fragmentary view in axial section of an alternator of the invention;

FIG. 2 is a fragmentary view in section of a detail of the alternator; and

MORE DETAILED DESCRIPTION

Figure 3:
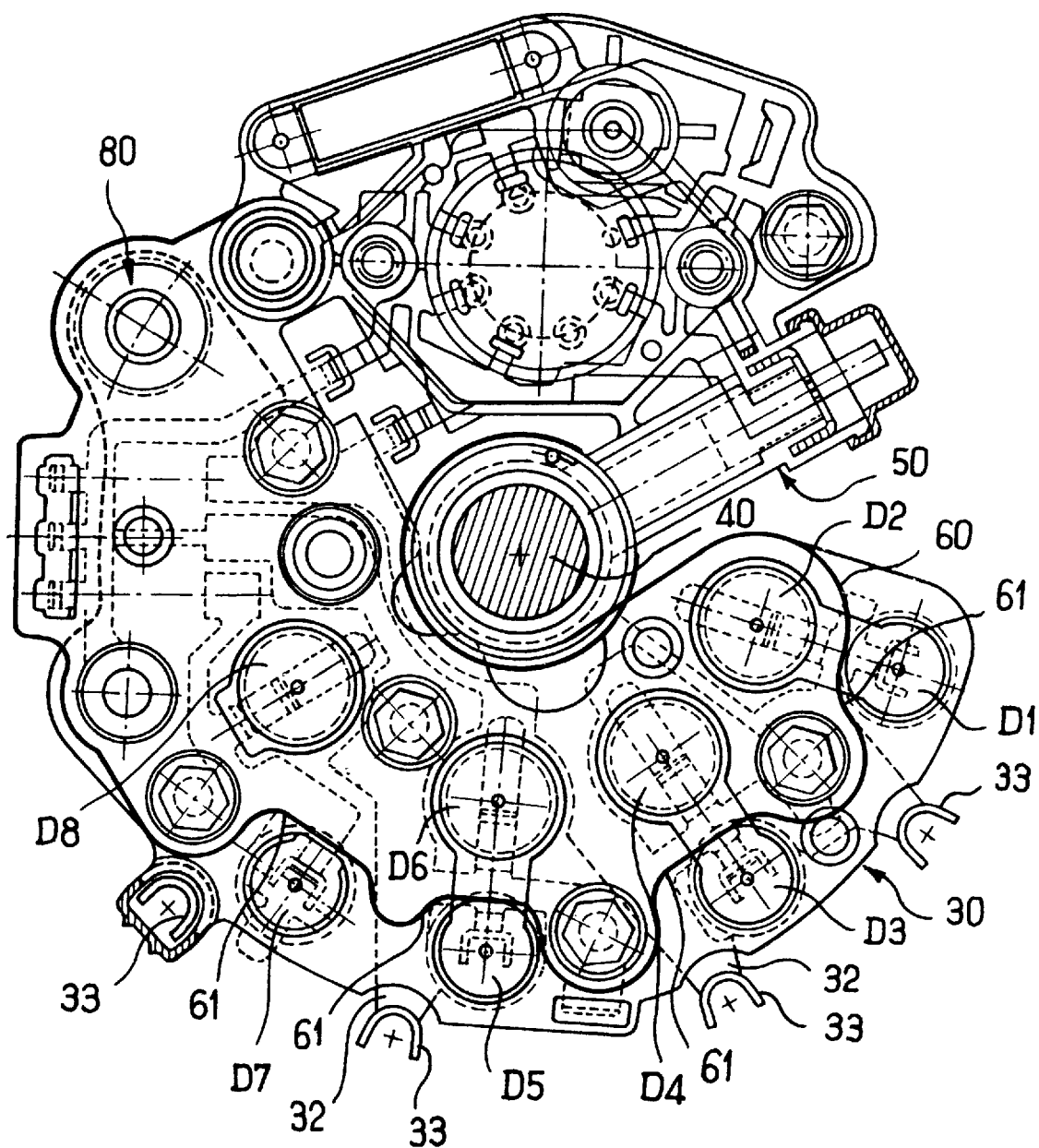
FIG. 3 is a fragmentary end view of the alternator of the invention.

With reference to the drawings, there is shown a portion of an alternator of the invention, and in particular its back region, remote from its driving pulley wheel.

The back half-shell is given overall reference 10. It comprises a cylindrical core 11 defining a housing for a ball bearing (not shown) received on a rotor shaft 40 that carries two slip rings 41 and 42.

The core 11 is extended radially by a web 13 in which air openings 14 are provided in a predetermined disposition for cooling the alternator.

Close to the radially outer edge of the web 13 there are formed generally circular openings 15 through which appropriately insulated conductors C pass for connecting the phase and the neutral terminals of a three-phase stator (not shown) of the alternator to a rectifier circuit. In conventional manner, the rectifier circuit comprises three pairs of diodes D1 & D2, D3 & D4, and D5 & D6 plus an additional pair of diodes D7 & D8, and in this case the diodes are engaged as force-fits, one diode in each pair being engaged in a respective one of the openings formed in the web 13 of the back half-shell 10 (itself connected to ground), and the other diodes being engaged in a dissipating support (shown in part at 60 in FIG. 1, and with its outline emphasized in FIG. 3) which is insulated from the half-shell 10, with the DC output voltage from the alternator being available between ground and said insulated dissipating support.

The diodes are connected to one another and to the conductors C by means of a connector given overall reference 30, which connector comprises a body that is generally in the shape of a plate 31 of insulating material molded onto a set of flat conductors.

Four of these conductors 32 for electrical connection to the conductors C, project radially outwards, being formed at their free ends with wire clamps 33 for receiving the conductors C.

A brush-carrying and regulator-carrying element 50 is also shown that includes, in particular, two brush-carrying units 51, 52 facing the slip rings 41 and 42 of the shaft 40.

The alternator also has a cap 20 of insulating material shaped so as to cover the back half-shell 10, the diodes D, their connector 30, and the element 50.

As shown in FIG. 1, each diode in the present case is in the form of a generally cylindrical body CP provided with knurling M and designed to be fixed as a force-fit in an opening having the same diameter formed either in the back half-shell 10 (for the negative side diodes) or else in the positive dissipating support 60 (for the positive side diodes).

The body CP of each diode constitutes a first connection terminal thereof, and the second connection terminal thereof is constituted by a lead Q extending axially from the body CP.

As can be seen in FIG. 1, which shows the disposition of one pair of diodes D5 & D6, the negative side diode D5 is engaged in the half-shell 10 that constitutes a negative dissipating support, being engaged from the inside thereof, so its lead Q projects through an opening 36 formed at a corresponding location in the flat connector 30. This lead extends beyond the general plane of the positive dissipating support 60 and a setback 21 is formed in the cover 20 of insulating material to receive the projecting end of said lead.

In addition, the positive side diode D6 is engaged as a force-fit in the opposite direction in the dissipating support 60, with the two diodes of the pair thus taking up a head-to-tail position.

The portion of the body CP of the diode D6 which extends towards the half-shell 10 beyond the dissipating support 60 projects into an opening 37 that is specially formed in the connector 30, said opening 37 optionally being common with the above-mentioned opening 36. The lead Q of the diode D6 extends towards the half-shell 10 beyond the connector 30, and according to a characteristic of the invention, it penetrates into the air-passing opening 14 that is formed in the half-shell 10 at the corresponding location.

It will be understood that this disposition makes it possible to reduce the axial distance between the diode D6 and the half-shell 10, thereby reducing the overall axial length of the alternator insofar as a portion of the axial length required for the positive side diodes is taken from the alternator body itself.

It should be observed at this point that because the negative side diodes overlie the openings 14 for passing cooling air, the cooling of the these diodes is improved.

Naturally, the same disposition is adopted for the other pairs of diodes, with as many openings 36, 37 being formed in the connector 30 and with as many air-passing openings 14 being formed in the half-shell.

Still with reference to FIG. 1, it can be seen that the leads Q of the two diodes in a given pair are connected together by a conductor 35 that forms a portion of the connector 30.

FIG. 3 shows that the positive dissipating support 60 includes notches 61 at locations in its outside edge that correspond to the various negative side diodes, which notches make it possible to establish the necessary insulating spacing between said dissipating support and the negative side diodes.

FIG. 2 shows a connection detail of the dissipating support 60, which support is at an output potential conventionally written B+, enabling said support to be connected firstly to an output terminal 80 for said potential B+ and secondly to the element 50 which carries, in particular, the electronic circuit for regulating the alternator.

The output terminal 80 is in the form of a threaded rod 80 which is knurled at its inside end that is received at a close fit in the dissipating support 60. A conductor 38 belonging to the connector 30 is also in contact with the terminal 80, a screw V for assembling the element 50 to the connector 30 and received in appropriate tapping in the half-shell 10 also serving to apply pressure that ensures contact between said conductor 30 and a conductor 28 which is itself embedded in the element 50 that forms a brush-carrier and a regulator-carrier.

Naturally, the present invention is not limited in any way to the embodiments described and shown, and the person skilled in the art will be able to apply any variant or modification thereto in compliance with the spirit of the invention.

In particular, the invention is equally applicable to diodes of the force-fit type and to diodes of the soldered or welded type. With such diodes, the negative side diodes are soldered to a dissipating support which is fitted to the back half-shell and is placed thereagainst.

We claim:

1. An alternator, in particular for a motor vehicle, comprising a front half-shell and a back half-shell to which stator windings are fixed and which ratably receives a rotor shaft, and a rectifier circuit comprising a plurality of power diodes each having a generally cylindrical body constituting a first connection terminal and a lead extending axially from said body and constituting a second connection terminal, the diodes comprising first diodes whose bodies are connected to ground and second diodes whose bodies are connected to an output voltage terminal of the alternator, the diodes being held in place by their respective bodies, the bodies of the first diodes being fixed to said back half-shell and the leads of said first diodes extending away from the interior of said back half-shell, while the bodies of the second diodes are fixed to a plate-shaped dissipating support which is located on the outer side of said back half-shell and spaced therefrom, and which is electrically insulated from said back half-shell, and the leads of said second diodes extending toward said back half-shell, said back half-shell including a plurality of alternator cooling openings respectively receiving said second diodes, wherein said leads of said second diodes project directly into their respective cooling openings in said back half-shell without contacting the edges of said openings, whereby the overall axial length of the alternator is reduced, and said second diodes are effectively cooled, wherein the first and second diodes are arranged in adjacent pairs, wherein an intermediate connecting plate is provided between said back half-shell and said plate-shaped dissipating support, and wherein said intermediate connecting plate includes a plurality of openings respectively associated with the pairs of adjacent diodes, said openings accommodating part of the first and second diodes of the associated pair, said intermediate connecting plate comprising in association with each pair of diodes a connector extending between said first and second diodes and having a first protruding part for connection to the lead of the first diode of said pair and a second protruding part for connection to the lead of the second diode of said pair.

2. An alternator according to claim 1, wherein the diodes are fixed by being force-fits, with the first diodes being force-fitted directly in the back half-shell.

3. An alternator according to claim 1, further including a generally plane diode connector extending between the back half-shell and the dissipating support.

4. An alternator according to claim 3, wherein said connector is made by overmolding insulating material on a set of generally plane conductors, and wherein openings are provided in the insulating material to pass the bodies of the diodes where they project beyond the half-shell and the dissipating support.

5. An alternator according to claim 4, wherein said openings formed in the insulating material of the connector are common for two adjacent first and second diodes.

6. An alternator according to claim 3, wherein, in association with a pair of adjacent positive and negative diodes, said connector includes a conductor projecting on both sides of the plane of said connector, said projecting portions being respectively connected to the leads of said adjacent diodes.

7. An alternator according to claim 3, wherein said connector includes a plane conductor designed to connect the dissipating support with an electronic regulator circuit by pressure contact at a screw for mounting said connector.

* * * * *